(12) United States Patent
Beresnevichiene et al.

(10) Patent No.: US 7,908,640 B2
(45) Date of Patent: Mar. 15, 2011

(54) DATA HANDLING APPARATUS AND METHODS

(75) Inventors: Yolanta Beresnevichiene, Bristol (GB); David Plaquin, Bristol (GB); Christopher I. Dalton, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1634 days.

(21) Appl. No.: 10/765,719

(22) Filed: Jan. 26, 2004

(65) Prior Publication Data

US 2004/0210906 A1 Oct. 21, 2004

(30) Foreign Application Priority Data

Jan. 27, 2003 (GB) .................................. 0301779.5

(51) Int. Cl.
- *G06F 7/04* (2006.01)
- *G06F 17/30* (2006.01)
- *G06F 17/00* (2006.01)
- *G06F 11/30* (2006.01)
- *G06F 12/14* (2006.01)
- *H04L 29/06* (2006.01)
- *H04N 7/16* (2006.01)
- *B41K 3/38* (2006.01)

(52) U.S. Cl. .................. 726/1; 726/2; 726/27; 713/155; 713/164; 713/189; 380/59

(58) Field of Classification Search .................. 726/1, 2, 726/16, 26, 27–30; 713/155–159, 164–167, 713/189; 709/225, 255; 380/59
See application file for complete search history.

(56) References Cited

U.S. PATENT DOCUMENTS

| | | | | |
|---|---|---|---|---|
| 4,584,639 | A | * | 4/1986 | Hardy ................................ 726/2 |
| 5,684,948 | A | * | 11/1997 | Johnson et al. ................... 726/29 |
| 5,757,908 | A | | 5/1998 | Cooper et al. ...................... 380/4 |
| 5,909,688 | A | * | 6/1999 | Yoshioka et al. ............. 707/200 |
| 5,925,126 | A | | 7/1999 | Hsieh ............................ 713/200 |
| 5,937,159 | A | * | 8/1999 | Meyers et al. ................... 726/20 |
| 5,956,710 | A | | 9/1999 | Yarom .............................. 707/3 |
| 6,487,665 | B1 | * | 11/2002 | Andrews et al. ................ 726/26 |
| 6,658,571 | B1 | * | 12/2003 | O'Brien et al. ................. 726/26 |
| 6,981,140 | B1 | * | 12/2005 | Choo ............................ 713/164 |
| 7,437,766 | B2 | * | 10/2008 | Cohen et al. .................... 726/26 |
| 2002/0092003 | A1 | | 7/2002 | Calder et al. .................. 717/138 |
| 2003/0023774 | A1 | * | 1/2003 | Gladstone et al. ............ 709/328 |

(Continued)

FOREIGN PATENT DOCUMENTS

GB 2 365 598 A 2/2002

(Continued)

OTHER PUBLICATIONS

"Proceedings of the Ottawa Linux Symposium," Chris M. Wright, Linux Security Module Framework, pp. 604-617, Ottawa, Ontario Canada, Jun. 26-29, 2002.*

(Continued)

*Primary Examiner* — Nasser Moazzami
*Assistant Examiner* — Oscar A Louie

(57) ABSTRACT

A data handling apparatus (400) for a computer platform (1) using an operating system executing a process, the apparatus comprising a system call monitor (402) for detecting predetermined system calls, and means (402, 404, 406) for applying a data handling policy to the system call upon a predetermined system call being detected, whereby the data handling policy is applied for all system calls involving the writing of data outside the process. A corresponding method is disclosed.

36 Claims, 9 Drawing Sheets

U.S. PATENT DOCUMENTS

2003/0145235 A1* 7/2003 Choo ............................ 713/201
2005/0076237 A1* 4/2005 Cohen et al. .................. 713/201

FOREIGN PATENT DOCUMENTS

GB      2 379 764 A      3/2003

OTHER PUBLICATIONS

"Policy-Enhanced Linux," Paul C. Clark, NIST, NISSC, Naval Postgraduate School, 2000, http://csrc.nist.gov/nissc/2000/proceedings/papers/015.pdf.*

"Multilevel Security in the UNIX Tradition," McIlroy et al., AT&T Bell Laboratories, 1995, http://citeseerx.ist.psu.edu/viewdoc/download?doi=10.1.1.52.366&rep=rep1&type=pdf, http://www.cs.dartmouth.edu/~doug/IX/163c.ps.*

Loscocco, P., et al., "Integrated Flexible Support for Security Policies into the Linux Operating System," Retrieved from http://www.nsa.gov/selinux/papers/freenix01.pdf <blocked::http://www.nsa.gov/selinux/papers/freenix01.pdf> Mar. 31, 2008.

* cited by examiner

DATA HANDLING APPARATUS AND METHODS

RELATED APPLICATION

This application is related to copending U.S. patent application Ser. No. 10/765,827 filed Sep. 30, 2004, which is entitled "Computer operating system data management" and which was filed in the names of the same inventors as named herein.

FIELD OF THE INVENTION

The present invention relates to data handling apparatus and methods, to computer programs for implementing such methods and to computing platforms configured to operate according to such methods.

BACKGROUND TO THE INVENTION

Data management is increasingly important as widespread access to public computer networks facilitates distribution of data. Distribution of data over public computer networks may be undesirable when the data in question comprises sensitive, confidential, copyright or other similar information.

A computer operating system can typically monitor input of data to a process or output of data by a process and apply appropriate management restrictions to these operations. Exemplary restrictions may prevent write operations to a public network, or to external memory devices for data having certain identifiable characteristics. However, manipulation of data within a process can not be monitored by the operating system. Such manipulation may modify the identifiable characteristics of data, and thus prevent the operating system from carrying out effective data management.

Particular problems arise when different types of data are assigned different levels of restriction, and processes involving data from different levels of restriction are run alongside one another. An operating system cannot guarantee that the different types of data have not been mixed. To maintain a desired level of restriction for the most restricted data in these circumstances, this level of restriction must be applied to all data involved in the processes. Consequently, data can only be upgraded to more restricted levels, leading to a system in which only highly trusted users/systems are allowed access to any data.

In prior art systems, security policies are applied at the application level, thus meaning that each application requires a new security policy module dedicated to it.

It is an aim of preferred embodiments of the present invention to overcome at least some of the problems associated with the prior art, whether identified herein, or otherwise.

SUMMARY OF THE INVENTION

According to the present invention in a first aspect, there is provided a data handling apparatus for a computer platform using an operating system executing a process, the apparatus comprising a system call monitor for detecting predetermined system calls, and means for applying a data handling policy to the system call upon a predetermined system call being detected, whereby the data handling policy is applied for all system calls involving the writing of data outside the process.

Using such an apparatus, because the security policy determination is initiated at the operating system level by monitoring system calls, it can be made application independent. So, for instance, on a given platform it would not matter which e-mail application is being used, the data handling apparatus could control data usage.

Suitably, in which the policy is to require the encryption of at least some of the data.

Suitably, a policy interpreter in its application of the policy automatically encrypts the at least some of the data.

Suitably, predetermined system calls are those involving the transmission of data externally of the computing platform.

Suitably, the means for applying a data handling policy comprises a tag determiner for determining any security tags associated with data handled by the system call, and a policy interpreter for determining a policy according to any such tags and for applying the policy.

Suitably, the policy interpreter is configured to use the intended destination of the data as a factor in determining the policy for the data.

Suitably, the policy interpreter comprises a policy database including tag policies and a policy reconciler for generating a composite policy from the tag policies relevant to the data.

Suitably, the computing platform comprises a data management unit, the data management unit arranged to associate data management information with data input to a process, and regulate operating system operations involving the data according to the data management information.

Suitably, the computing platform further comprises a memory space, and is arranged to load the process into the memory space and run the process under the control of the data management unit.

Suitably, the data management information is associated with at least one data sub-unit as data is input to a process from a data unit comprising a plurality of sub-units.

Suitably, data management information is associated with each independently addressable data unit.

Suitably, the data management unit comprises part of an operating system kernel space.

Suitably, the operating system kernel space comprises a tagging driver arranged to control loading of a supervisor code into the memory space with the process.

Suitably, the supervisor code controls the process at run time to administer the operating system data management unit.

Suitably, the supervisor code is arranged to analyse instructions of the process to identify operations involving the data, and, provide instructions relating to the data management information with the operations involving the data.

Suitably, the memory space further comprises a data management information area under control of the supervisor code arranged to store the data management information.

Suitably, the data management unit comprises a data filter to identify data management information associated with data that is to be read into the memory space.

Suitably, the data management unit further comprises a tag management module arranged to allow a user to specify data management information to be associated with data.

Suitably, the data management unit comprises a tag propagation module arranged to maintain an association with the data that has been read into the process and the data management information associated therewith.

Suitably, the tag propagation module is arranged to maintain an association between an output of operations carried out within the process and the data management information associated with the data involved in the operations.

Suitably, the tag propagation module comprises state machine automatons arranged to maintain an association between an output of operations carried out within the process and the data management information associated with the data involved in the operations.

According to the present invention in a second aspect, there is provided a data handling method for a computer platform using an operating system executing a process, the method comprising the steps of: detecting predetermined system calls, and applying a data handling policy to the system call upon a predetermined system call being detected, the data handling policy being applied for all system calls involving the writing of data outside the process.

Suitably, the policy is to require the encryption of at least some of the data.

Suitably, in its application of the policy at least some of the data is automatically encrypted.

Suitably, predetermined system calls are those involving the transmission of data externally of the computing platform.

Suitably, the method includes the steps of: determining any security tags associated with data handled by the system call, determining a policy according to any such tags and applying the policy.

Suitably, a composite policy is generated from the tag policies relevant to the data.

Suitably, the intended destination of the data is used as a factor in determining the policy for the data.

Suitably, the method further comprises the steps of: (a) associating data management information with data input to a process; and (b) regulating operating system operations involving the data according to the data management information.

Suitably, supervisor code administers the method by controlling the process at run time.

Suitably, the step (a) comprises associating data management information with data as the data is read into a memory space.

Suitably, the step (a) comprises associating data management information with at least one data sub-unit as data is read into a memory space from a data unit comprising a plurality of data sub-units.

Suitably, the step (a) comprises associating data management information with each independently addressable data unit that is read into the memory space.

Suitably, the data management information is written to a data management memory space under control of the supervisor code.

Suitably, the supervisor code comprises state machine automatons arranged to control the writing of data management information to the data management memory space.

Suitably, the step (b) comprises sub-steps (b1) identifying an operation involving the data; (b2) if the operation involves the data and is carried out within the process, maintaining an association between an output of the operation and the data management information; and (b3) if the operation involving the data includes a write operation to a location external to the process, selectively performing the operation dependent on the data management information.

Suitably, the step (b1) comprises: analysing process instructions to identify operations involving the data; and, providing instructions relating to the data management information with the operations involving the data.

Suitably, the process instructions are analysed as blocks, each block defined by operations up to a terminating condition.

According to the present invention in a third aspect, there is provided a computer program for controlling a computing platform to operate in accordance with the second aspect of the invention.

According to the present invention in a fourth aspect, there is provided a computer platform configured to operate according with the second aspect of the invention.

BRIEF DESCRIPTION OF THE DRAWINGS

For a better understanding of the invention, and to show how embodiments of the same may be carried into effect, reference will now be made, by way of example, to the accompanying diagrammatic drawings in which.

DESCRIPTION OF THE PREFERRED EMBODIMENTS

Data management in the form of data flow control can offer a high degree of security for identifiable data. Permitted operations for identifiable data form a security policy for that data. However, security of data management systems based on data flow control is compromised if applications involved in data processing can not be trusted to enforce the security policies for all data units and sub-units to which the applications have access. In this document, the term "process" relates to a computing process. Typically, a computing process comprises the sequence of states run through by software as that software is executed.

Figure 1:
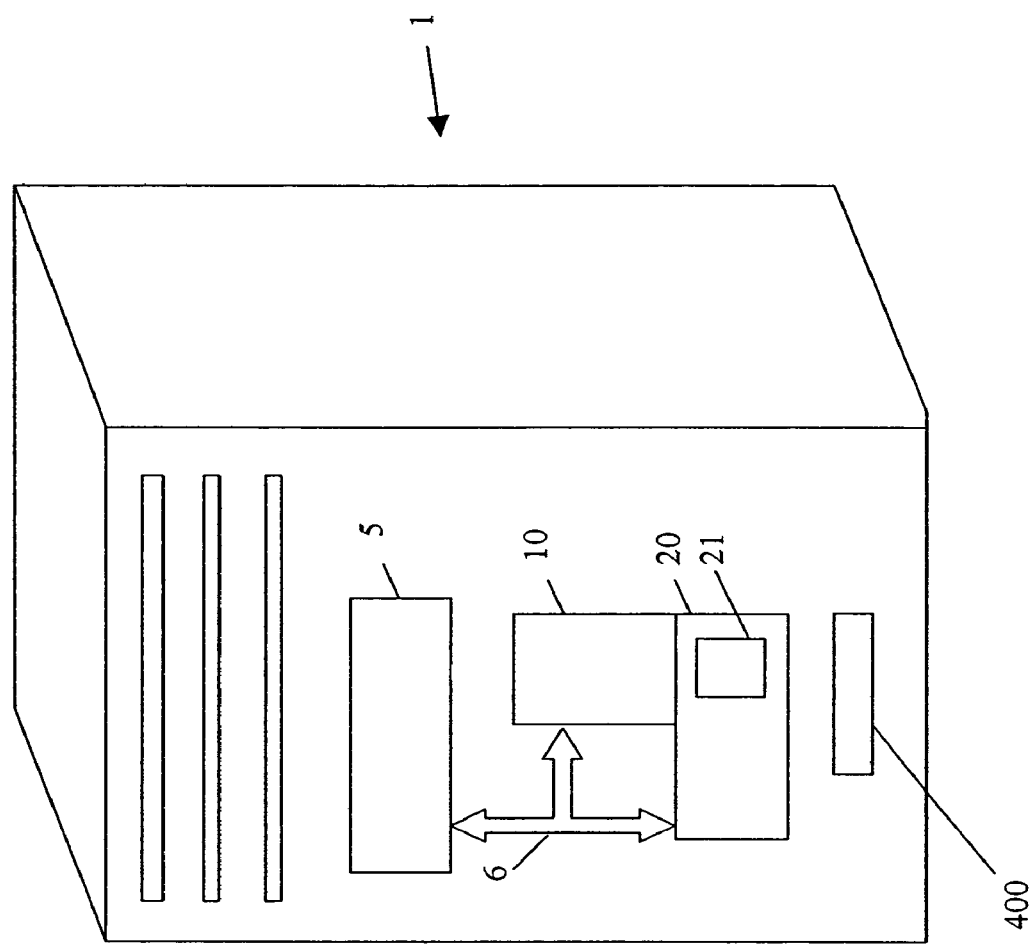
FIG. 1 shows a computing platform for computer operating system data management according to the present invention.

FIG. 1 shows a computing platform 1 for computer operating system data management comprising, a processor 5, a memory space 10, an OS kernel space 20 comprising a data management unit 21 and a disk 30. The memory space 10 comprises an area of memory that can be addressed by user applications. The processor 5 is coupled to the memory space 10 and the OS kernel space 20 by a bus 6. In use, the computing platform 1 loads a process to be run on the processor 5 from the disk 30 into the memory space 10. It will be appreciated that the process to be run on the processor 5 could be loaded from other locations. The process is run on the processor under the control of the data management unit 21 such that operations involving data read into the memory space 10 by the process are regulated by the data management unit 21. The data management unit 21 regulates operations involving the data according to data management information associated with the data as it is read into the memory space 10.

The data management unit 21 propagates the data management information around the memory space 10 as process operations involving that data are carried out, and prevents the data management information from being read or written over by other operations. The data management unit includes a set of allowable operations for data having particular types of data management information therewith. By inspecting the data management information associated with a particular piece of data, the data management unit 21 can establish whether a desired operation is allowed for that data, and regulate the process operations accordingly.

Figure 2:
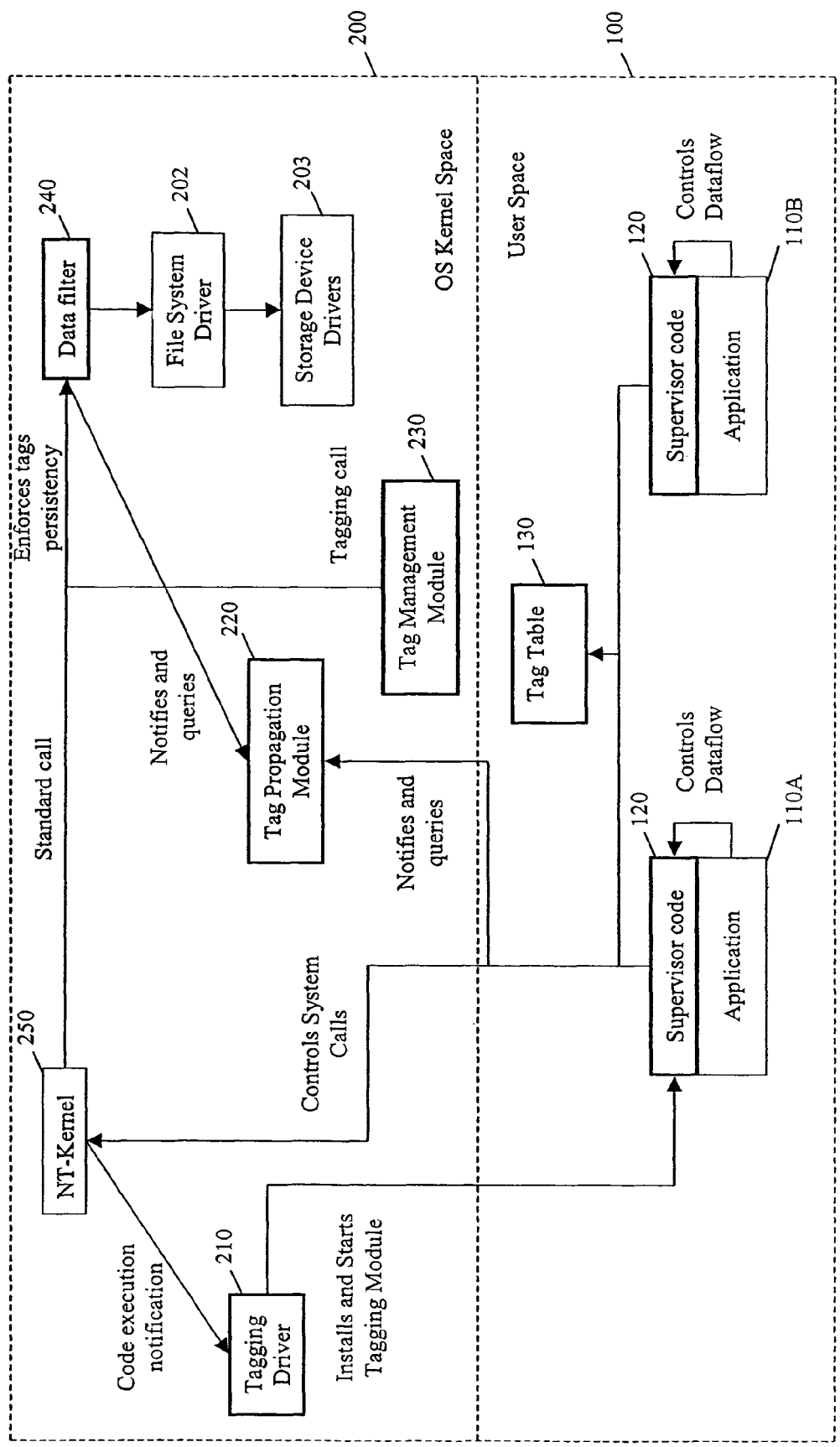
FIG. 2 shows a first operating system data management architecture suitable for use in the computing platform of FIG. 1.

FIG. 2 shows an example operating system data management architecture comprising an OS kernel space and a memory space suitable for use in the computing platform of FIG. 1. The example architecture of FIG. 2 enables regulation of operations involving data read into a memory space by enforcing data flow control on applications using that data. The example architecture of FIG. 2 relates to the Windows NT operating system. Windows NT is a registered trade mark of Microsoft Corporation.

FIG. 2 shows a memory space comprising a user space 100 and an OS kernel space 200. The user space 100 comprises application memory spaces 110A,110B, supervisor code 120A,120B, and a tag table 130. The OS kernel space 200 comprises a standard NT kernel 250, file system driver 202 and storage device drivers 203. The OS kernel space 200 further comprises a tagging driver 210, a tag propagation module 220, and a tag management module 230 and a data filter 240.

Preferred embodiments of the present invention propagate information flow control labels or tags with data at run time. A tag of an object is changed when a value flows to an object in the process. However, it is also possible to derive information about objects involved in a process implicitly arising from conditional statements of the type "if", "while", "for" and "do while". This type of information flow is easily traceable at the programming language level, but at run-time the full program flow cannot be analysed so it is impractical to attempt to detect all data dependent on such conditionals while the process executes.

By way of example, if in an executable program the value of a variable "a" is determined or affected (e.g. incremented) by the value of another variable "b", some information about "b" can be deduced from the value of "a".

Figure 3:
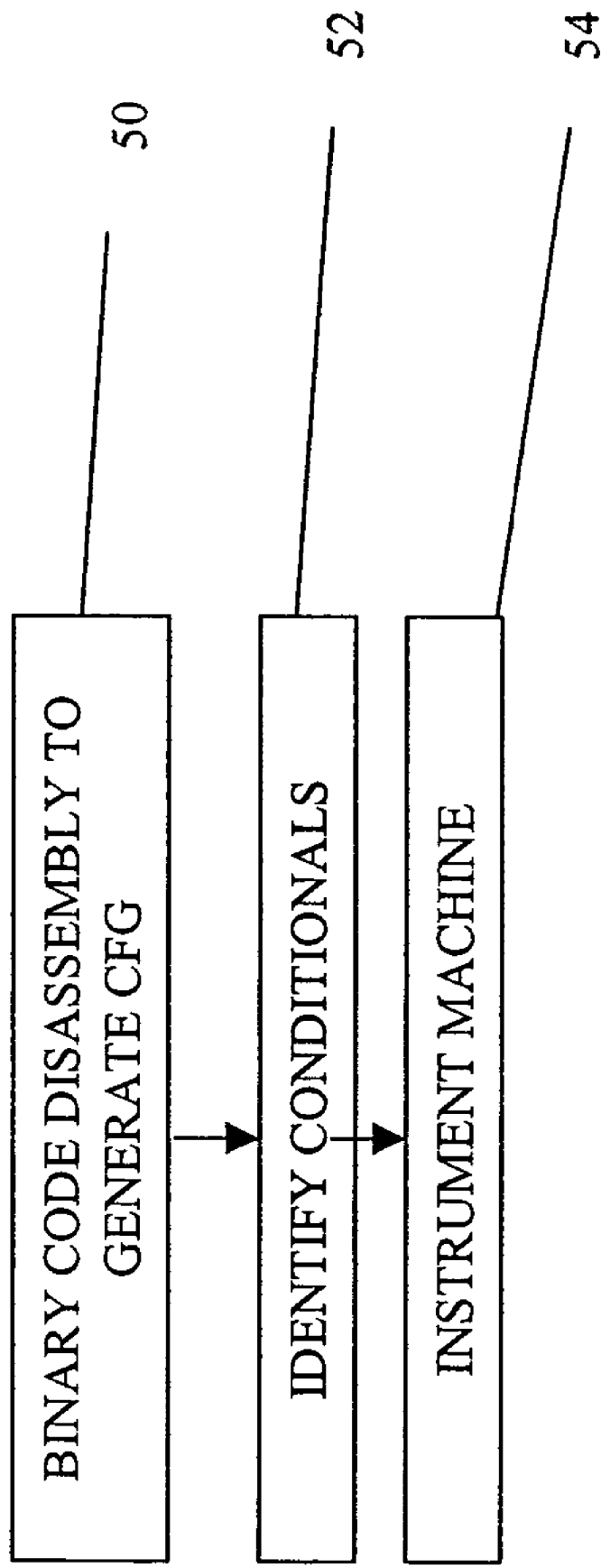
FIG. 3 shows a static code analysis method for use with the present invention.
Figure 4:
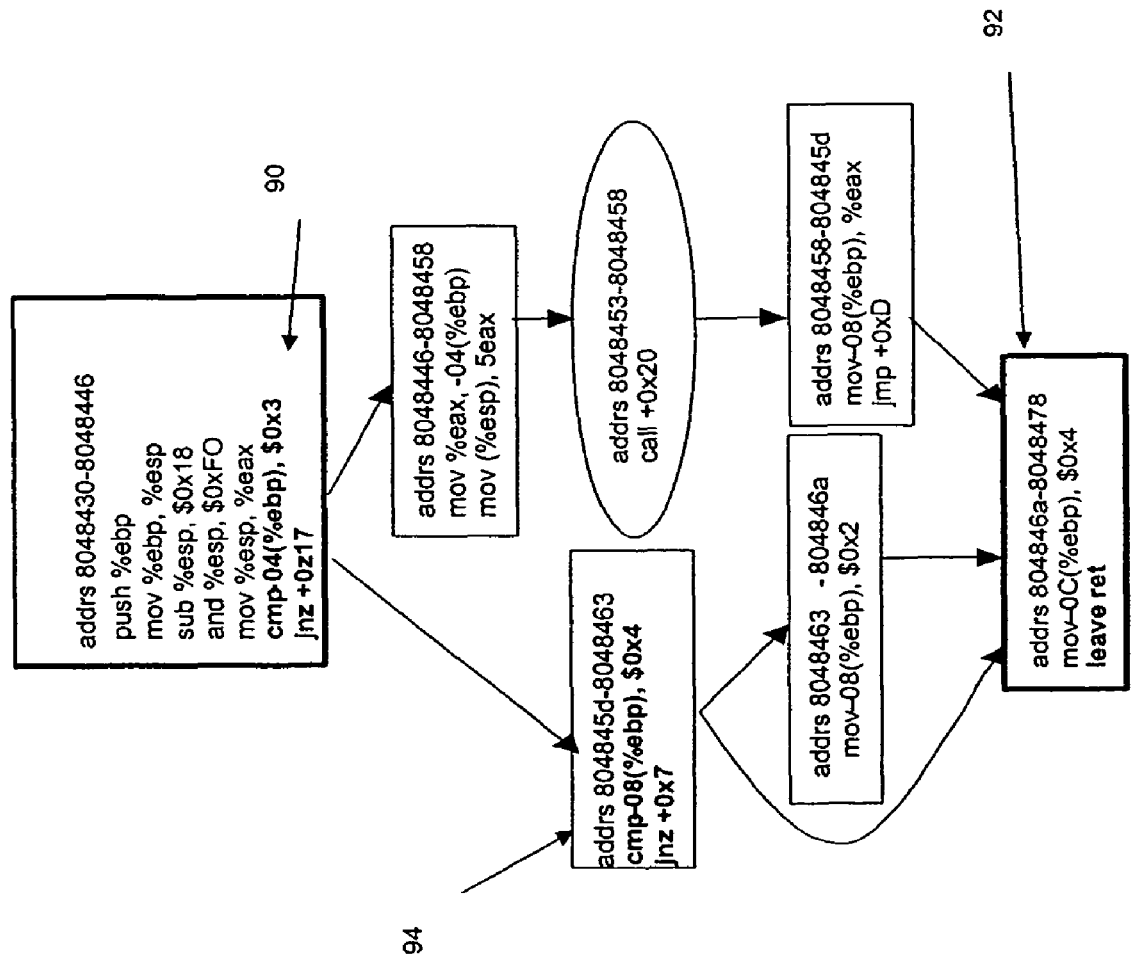
FIG. 4 shows a control flow graph with reference to FIG. 3.

Accordingly, to address this problem, it is proposed to undertake a static code analysis to generate information about the executable program usable at run-time. In order to do so, with reference to FIG. 3 of the drawings that follow, a static code analysis method is described in which in step 50 binary code disassembly is used to construct a control flow graph (CFG) that represents an abstract structure of the machine code of the executable program. Once the CFGs have been constructed, the basic blocks can be analysed for conditional jumps and loops. In a CFG conditional structures have the useful property of having a single beginning point at which the control starts and a single exit point at which the control leaves. By way of example, with reference to FIG. 4, a CFG is shown in which two conditional structures are shown, one embedded in the other. A first conditional structure has an entry point 90 and an exit point 92. A second conditional structure has an entry point 94 and the same exit point 92.

All branches following a conditional have an implicit flow of information from the conditional. At the machine code level this is the value set in a particular memory or register location. Therefore, when calculating the tags for branches following a conditional it is necessary to take into account the tag of the location in that conditional.

In order to have the control flow at run-time, further instrumentation code is added to the machine code of the executable program. In step 52 of FIG. 3, code blocks affected by conditionals are identified from the CFG. During the static analysis, the code is then instrumented (step 54) to provide additional information about the execution path taken. This includes entry and exit points of conditional structures, as well as of the blocks within the conditional branches. A tag of a particular conditional is no longer relevant when the process flow reaches the immediate forward denominator node of that conditional branch node in the CFG.

The CFG construction and static code instrumentation can be performed ahead of time or at least at local time to reduce run-time performance overheads. There may be scenarios in which run-time performance overheads are not an issue and these steps can then be carried out at run-time if desired.

When an application is to be run in the user space 100, information comprising the application code along with any required function libraries, application data etc. is loaded into a block of user memory space comprising the application memory space 110 under the control of the NT kernel 250. The tagging driver 210 further appends supervisor code to the application memory space 110 and sets aside a memory area for data management information. This memory area comprises the tag table 130.

In preference to allowing the NT kernel 250 to run the application code, the tagging driver 210 receives a code execution notification from the NT kernel 210 and runs the supervisor code 120

When run, the supervisor code 120 scans the application code starting from a first instruction of the application code, and continues through the instructions of the application code until a terminating condition is reached. A terminating condition comprises an instruction that causes a change in execution flow of the application instructions. Example terminating conditions include jumps to a subroutines, interrupts etc. A portion of the application code between terminating conditions comprises a block of code.

The block of code is disassembled, and data management instructions are provided for any instructions comprising data read/writes to the memory, disk, registers or other functional units such as logic units, or to other input/output (I/O) devices. The data management instructions may include the original instruction that prompted provision of the data management instructions, along with additional instructions relating to data management. Once a block of the application code has been scanned and modified, the modified code can be executed. The scanning process is then repeated, starting with the first instruction of the next block.

At a first system call of the application code relating to a particular piece of data, typically a read instruction, the first data management instruction associates data management information with the data. The data management information comprises a tag held in the tag table 130. The tag table 130 comprises a data management information memory area which can only be accessed by the supervisor code 120. Preferably, a tag is applied to each independently addressable unit of data—normally each byte of data. By applying a tag to each independently addressable piece of data all useable data is tagged, and, maximum flexibility regarding the association of data with a tag is maintained. A tag may preferably comprise a byte or other data unit.

A tag identifies a data management policy to be applied to the data associated with that tag. Different data management policies may specify a number of rules to be enforced in relation to data under that data management policy, for example, "data under this policy may not be written to a public network", or "data under this policy may only be operated on in a trusted environment". When independently addressable data units have their own tags it becomes possible for larger data structures such as e.g. files to comprise a number of independently addressable data units having a number of different tags. This ensures the correct policy can be associated with a particular data unit irrespective of its location or association with other data in a memory structure, file structure or other data structure. The data management policy to be applied to data, and hence the tag, can be established in a number of ways.

(1) Data may already have a predetermined data management policy applied to it, and hence be associated with a pre-existing tag. When the NT kernel 250 makes a system call involving a piece of data, the data filter 240 checks for a pre-existing tag associated with that data, and if a pre-existing tag is present notifies the tag propagation module 220 to include the tag in the tag table 130, and to maintain the association of the tag with the data. Any tag associated with the data is maintained, and the data keeps its existing data management policy.

If there is no tag associated with the data, the following tag association methods can be used.

(2) Data read from a specific data source can have a predetermined data management policy corresponding to that data source applied to it. The data filter 240 checks for a data management policy corresponding to the specific data source, and if a predetermined policy does apply to data from that source notifies the tag propagation module 220 to include the corresponding tag in the tag table 130 and associate the tag with the data. For example, all data received over a private network from a trusted party can be associated with a tag indicative of the security status of the trusted party.

(3) When data has no pre-existing tag, and no predetermined data management policy applies to the data source from which the data originates, the tag management module 230 initiates an operating system function that allows a user to directly specify a desired data management policy for the data. The desired data management policy specified by the user determines the tag associated with the data. To ensure that the operating system function is authentic and not subject to subversion, it is desired that the operating system function of the tag management module 230 is trusted. This trust can be achieved and demonstrated to a user in a number of ways, as will be appreciated by the skilled person.

(4) Alternatively, when data has no pre-existing tag, and no predetermined data management policy applies to the data source from which the data originates a default tag can be applied to the data.

Data management instructions are provided for subsequent instructions relating to internal processing of the tagged data. The data management instructions cause the tag propagation module 220 to maintain the association between the data and tag applied to it. Again, the data management instructions may include the instructions relating to internal processing of the data along with additional data management instructions. If the data is modified, e.g. by a logical or other operations, the relevant tag is associated with the modified data. Data management instructions for maintaining the association of tags with data as that data is manipulated and moved can be implemented using relatively simple state machine automatons. These automatons operate at the machine code level to effectively enforce the association and propagation of tags according to simple rules. For example, if data is moved the tag associated with the data at the move destination should be the same as the tag associated with the data before the move. In this simple example, any tag associated with the data at the move destination can be overwritten by the tag associated with the incoming data. Other automatons can be used to combine tags, swap tags, extend tags to other data, leave tags unchanged etc. dependent on the existing data tag(s) and type of operation to be carried out on the data.

The supervisor code 120 manages the tags in the tag table. A simple form of tag management comprises providing a data tag table that is large enough to accommodate a tag for each piece of tagged data. This results in a one-to-one relationship between the data in the application memory space 110, and the data tags in the tag table, and a consequent doubling of the overall memory space required to run the application. However, memory is relatively cheap, and the one to one relationship enables simple functions to be used to associate the data with the relevant tag. As an alternative, different data structures can be envisaged for the data management information area, for example, a tag table can identify groups of data having a particular tag type. This may be advantageous when a file of data all associated with a single tag is involved in an operation. When more than one application is loaded in the user space 100, as shown in FIG. 2 with the two application memory spaces 110A,110B, a shared tag table 130 can be used. As already mentioned, different tags can be applied to a separate data units within a file or other data structure. This allows an improved flexibility in subsequent manipulation of the data structure ensuring the appropriate policy is applied to the separate data units.

Data management instructions are also provided for instructions relating to writing of data outside the process (for all the described embodiments of the present invention). The data management instructions may include the instructions relating to writing of data outside the process along with other data management instructions. In this case, the data management instructions prompt the supervisor code 120 to notify the tag propagation module 220 of the tag associated with the data to be written. The system call to the NT kernel 250 is received by the data filter 240. The data filter 240 queries the allowability of the requested operation with the tag propagation module 220 to verify the tag associated with the data to be written, and check that the data management policy identified by the tag allows the desired write to be performed with the data in question. If the desired write is within the security policy of the data in question, it is performed, with the data filter 240 controlling the file system driver 202 to ensure that the storage device drivers 203 to enforce the persistence of the tags with the stored data. If the data is not permitted to be written as requested, the write operation is blocked. Blocking may comprise writing random bits to the requested location, writing a string of zeros or ones to the requested location, leaving the requested location unaltered, or encrypting the data before writing.

In order to take tags in conditionals into account when new tags are compiled a stack-based mechanism is used. At run-time the program counter (PC) of a process p has a tag p' associated with that counter. The tag reflects the current execution structure of the process and represents the tags of entries to the conditional structures. Thus, whenever a conditional entry point is detected, the current tag p' is pushed further on the stack and the label of a conditional expression c is added, resulting in a new tag based on the tags p' and c'.

If a statement is conditional on the value of n expressions $c_1, \ldots, c'_n$ then the tags of these locations are first combined and the end result combined with p'.

During all operations from the entry point the tags of the locations in branching expressions are updated by taking into account the current tag of the PC.

The tags are updated accordingly for all memory and register locations encountered after the conditional. When the node is reached that, according to the CFG, is the immediate forward denominator of the conditional branch node, the current PC tag is popped off the stack and hence its value is restored to what it was before the conditional was encountered.

At run-time the instrumented machine code is run under a dynamic instruction stream modification framework. This again involves re-writing the machine code but this time, unlike the static analysis, it is done dynamically at run-time to ensure the instrumentations are not bypassed.

When a process reads bytes from a data source (such as a file) into its address space via a system call, the added machine code makes it run an additional system call to determine the kernel maintained tag values for those particular bytes in the data source. These tag values are loaded into the sparse array for the locations within the process address space that the data was read into.

At a certain point, usually at the time of a system call, the tagging/modelling module is invoked to update the tag values of the memory and register locations within the process. Given previously known tags for these locations and given a trace of machine code instructions (such as mov B,A) that cause a write from one area of the process address space (or register) to another area of the address space (or register) as well as instructions (such as add or sub) that cause data to be combined new tag values are computed accordingly.

When a process attempts to write data outside of its address space (via a system call) the operation is rewritten so that the process first makes a system call to the kernel passing the tag values of the data it is trying to write. At this point the kernel can be instrumented to check whether any particular policy, such as access control, applies on the passed tag values. In cases when the policy prohibits writes to the intended destination the original system call is skipped over and an error call is returned to the process.

Figure 5:
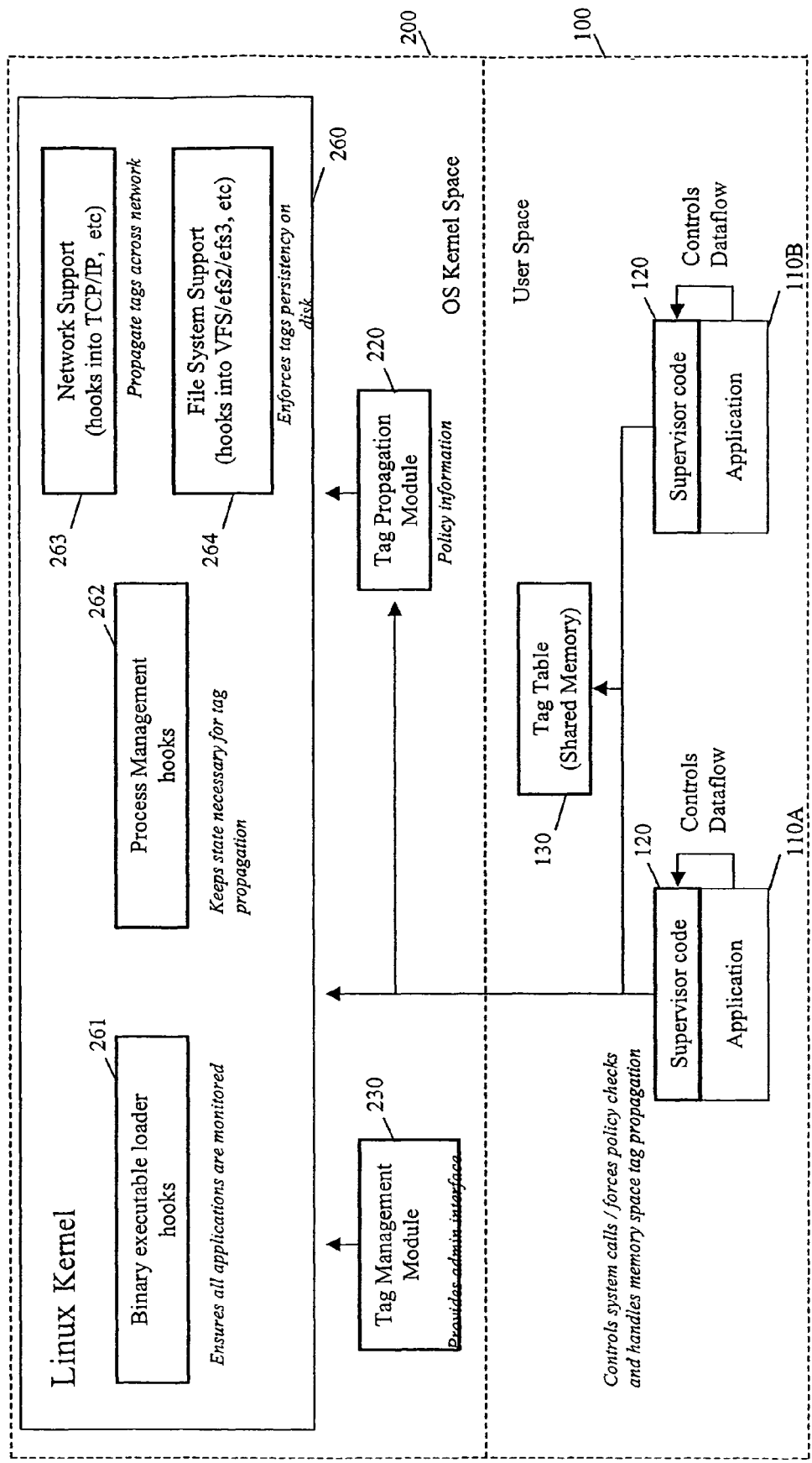
FIG. 5 shows a second operating system data management architecture suitable for use in the computing platform of FIG. 1.

A second example operating system data management architecture suitable for use in the computing platform of FIG. 1 is shown in FIG. 5. The example operating system data management architecture of FIG. 3 relates to the Linux operating system.

FIG. 5 shows a user space 100 and an OS kernel space 200. The user space 100 comprises application memory spaces 110A, 110B, supervisor code 120A, 120B, and a tag table 130. The OS kernel space 200 comprises a tag propagation module 220, a tag management module 230, along with a Linux kernel 260 comprising an executable loader module 261, a process management module 262, a network support module 263 and a file system support module 264.

As the Linux operating system is open source, a number of the functions required to implement the data management system can be incorporated into the existing functional blocks of the kernel. In the example architectures of FIG. 5, the executable loader module 261, the process management module 262, the network support module 263 and the file system support module 264 are be modified versions of those included in a standard Linux kernel, as will be described below.

As before, the supervisor code 120 controls system calls, handles memory space tag propagation, and instructs policy checks in the OS kernel space 200 when required. Also as before, the tag propagation module 220 maintains policy information relating to allowable operations within the policies, and the tag management module 230 provides an administrative interface comprising an operating system function that allows a user to directly specify a desired data management policy for the data.

The operation of the Linux kernel 260 allows the data management architectures shown to carry out data flow control. The executable loader 261 includes a tagging driver that ensures applications are run under the control of the supervisor code 120. The process management module 262 carries out process management control to maintain the processor running the application or applications in a suitable state to enable tag association, monitoring and propagation. The network support module 263 enables the propagation of tags with data across a network, and the file system support module 264 enables the propagation of tags with data on disk. The network support module 263 and the file system support module 264 together provide the functionality of the data filter of FIG. 2. Again, state machine based automation can be used to perform basic tag association, monitoring and propagation functions at a machine code level.

The modifications to the executable loader module 261, the process management module 262, the network support module 263 and the file system support module 264 can be easily implemented with suitable hooks.

Figure 6:
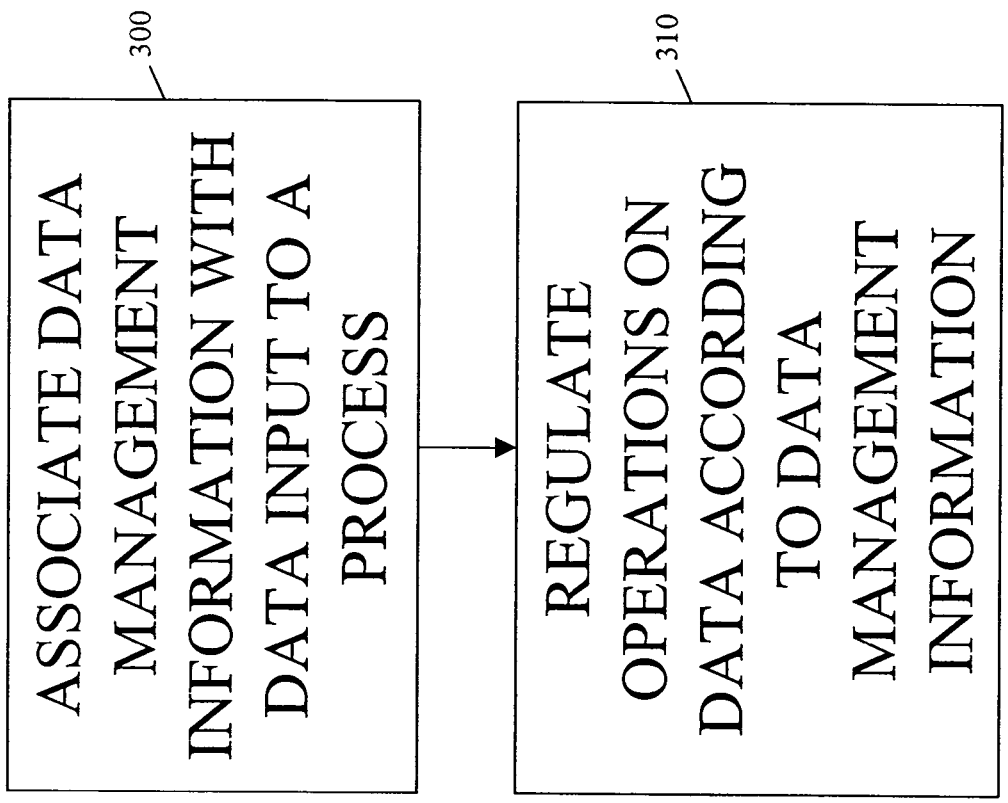
FIG. 6 shows a flow diagram comprising steps involved in operation of the above described figures.

FIG. 6 shows a flow diagram outlining basic steps in an example method of operating system data management.

The method comprises a first step 300 of associating data management information with data input to a process; and a second step 310 of regulating operations involving the data input to the process in the first step 300 according to the data management information associated with the data in the first step 300. The basic first and second steps 300,310 are further expanded upon in the flow diagram of FIG. 7.

Figure 7:
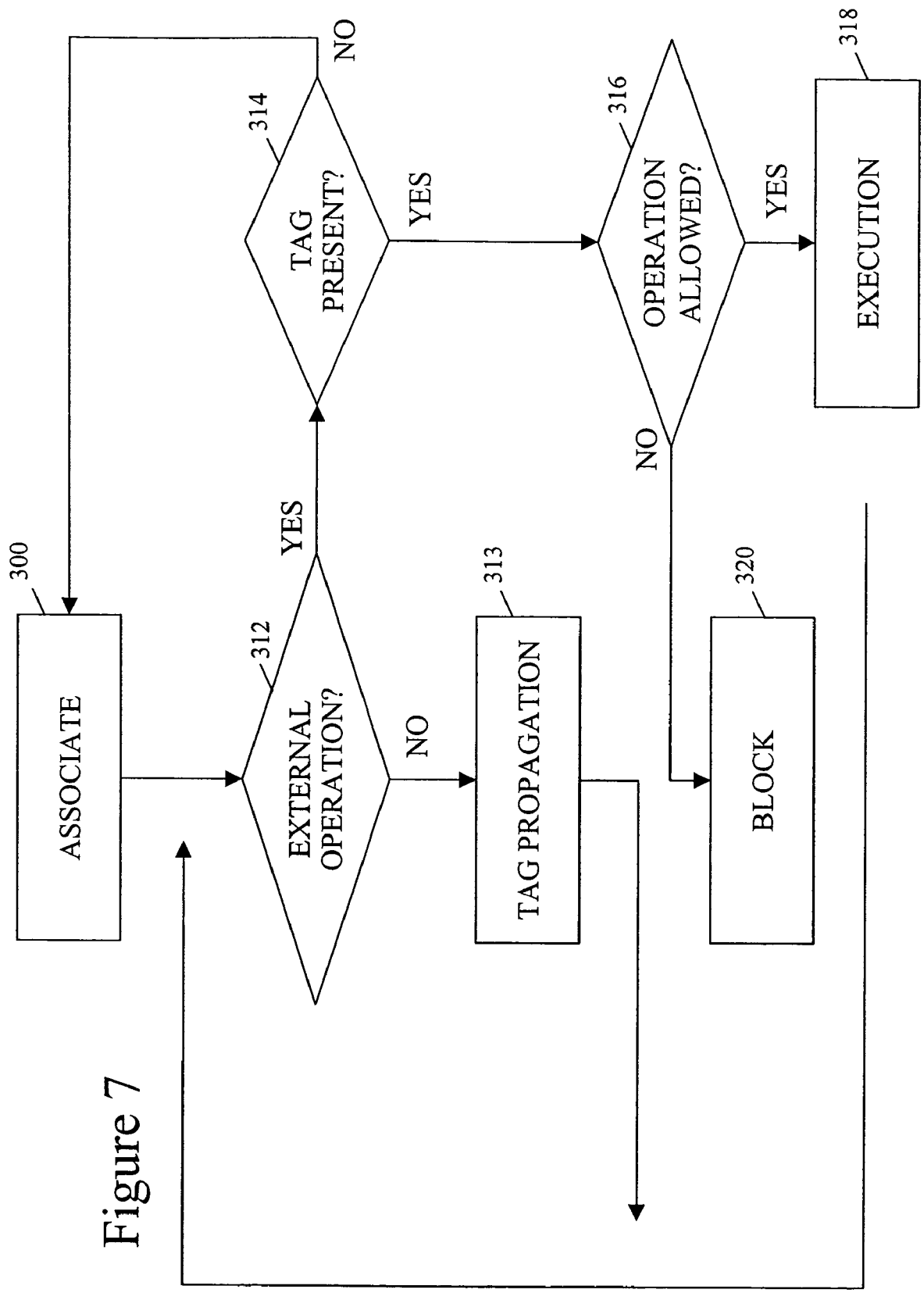
FIG. 7 shows a flow diagram comprising further steps involved as part of the FIG. 6 operation.

FIG. 7 shows a flow diagram outlining further steps in an example method of operating system data management.

The method of FIG. 7 starts with an "external operation?" decision 312. If data on which the method is performed is read into memory space associated with a process from a location external to the memory space associated with the process, the outcome of the "external operation?" decision 312 is YES. Furthermore, if the data within the process is to be written to an external location, the outcome of the "external operation?" decision 312 is also YES. Following a positive decision at the "external operation?" decision, the method moves to the "tag present?" decision 314. Operations involving data within the process result in a negative outcome at the "external operation?" decision 312.

At the "tag present?" decision 314, it is determined whether the data involved in the operation has data management information associated with it. If the data has no data management information associated with it, the association step 300 is performed, and the method returns to the "external operation?" decision 312.

In the association step 300, data management information is associated with the data in question. This association can be carried out by any of the methods described earlier, or by other suitable methods.

Following a positive decision at the "tag present?" decision 314, the method moves to the "operation allowed?" decision 316. At this decision, the data management information associated with the data is examined, and its compatibility with the specified external operation identified in the "external operation?" decision 312 is established.

If the data management information is compatible with the external operation, it is carried out in the execution step 318. Following the execution step 318, the method returns to the "external operation?" decision 312. Alternatively, if the data management information is not compatible with the external operation, it is blocked in the blocking step 318. Blocking in step 318 can comprise any of the methods described earlier, or by other suitable methods.

Any operations identified at the "external operation?" decision 312 as internal operations are carried out, with association of the data involved in the operation with the relevant data management information maintained in the tag propagation step 313.

Including the data management functionality with an operating system provides a first level of security, as operating system operation should be relatively free from security threatening bugs compared to either commercial or open source application software. Furthermore, if the operating system allows trusted operation after a secure boots, for example as provided for by the Trusted Computing Platform Alliance (TCPA) standard, the data management functionality can also form part of the trusted system. This enables the data management functions to also form part of the trusted system, enabling e.g. digital rights management or other secrecy conditions to be enforced on data.

It is possible that the computing platform for operating system data management could refuse to open or write data with a pre-existing tag unless the computing platform is running in a trusted mode, adding to the enforceability of data flow control under the data management system. This is particularly useful when encrypted data is moved between trusted computing platforms over a public network.

An operating system data management method, and a computing platform for operating system data management have been described. The data management method and computing platform allow a supervisor code to monitor data flow into and out of an application using data management information. As data is used within an application process, the data management information is propagated with the data. This allows the supervisor code to ensure that only external write operations which are compatible with a data management policy for the data are performed. The data flow monitoring and enforcement enabled by the data management method and computing platform facilitate the construction of systems that support digital rights management and other data privacy functions, but avoid the problems associated with system wide approaches to data flow control systems. In particular, the granularity provided by associating data management information with data units that are individually addressable rather than with a data structure such as a file of which the individually addressable data units are part offers improved flexibility in how security is enforced. The method and computing platform described do not require source code modification of application and subsequent recompilation. Furthermore, the method and system described can easily be retrospectively implemented in a variety of known operating systems, for example Windows NT and Linux as show herein.

The functionality described above can also be implemented on a virtual machine.

There will now be described a method and apparatus for handling tagged data. These are applicable to the data tagged and propagated as described above as well as to data tagged in other ways, for instance at the file level (i.e. all data in a file having the same tag).

Figure 8:
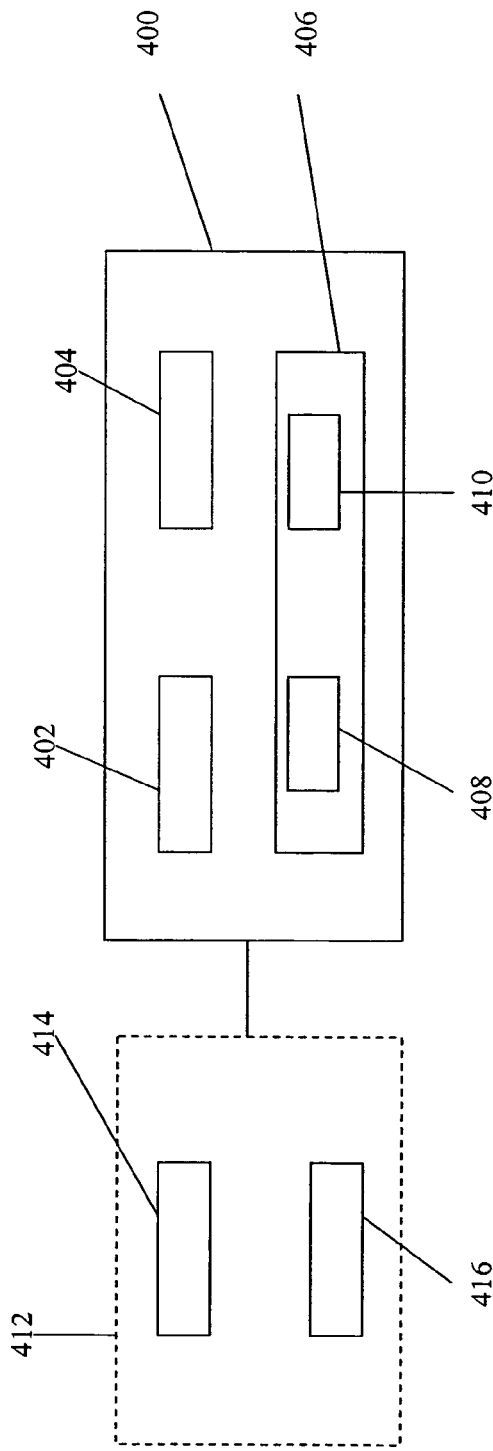
FIG. 8 shows a data handling apparatus according to the present invention.

FIG. 8 of shows a data handling apparatus 400 forming a part of the computing platform 1 shown in FIG. 1. The data handling apparatus 400 comprises a system call monitor 402, a tag determiner 404 and a policy interpreter 406. The policy interpreter 406 comprises a policy database 408 and a policy reconciler 410. Also shown in FIG. 6 are external devices indicated generally at 412, which can be local external devices 414 such as printers, CD writers, floppy disk drives, etc or any device on a network (which can be a local network, a wide area network or a connection to the Internet), such as a printer, another computer, CD writer, etc. The data handling apparatus 400 can be embodied in hardware or software, and in the latter case may be a separate application or more preferably runs at an operating system level.

Additionally, there is shown a conditional detector 418 and a conditional tag propagator 420.

Figure 9:
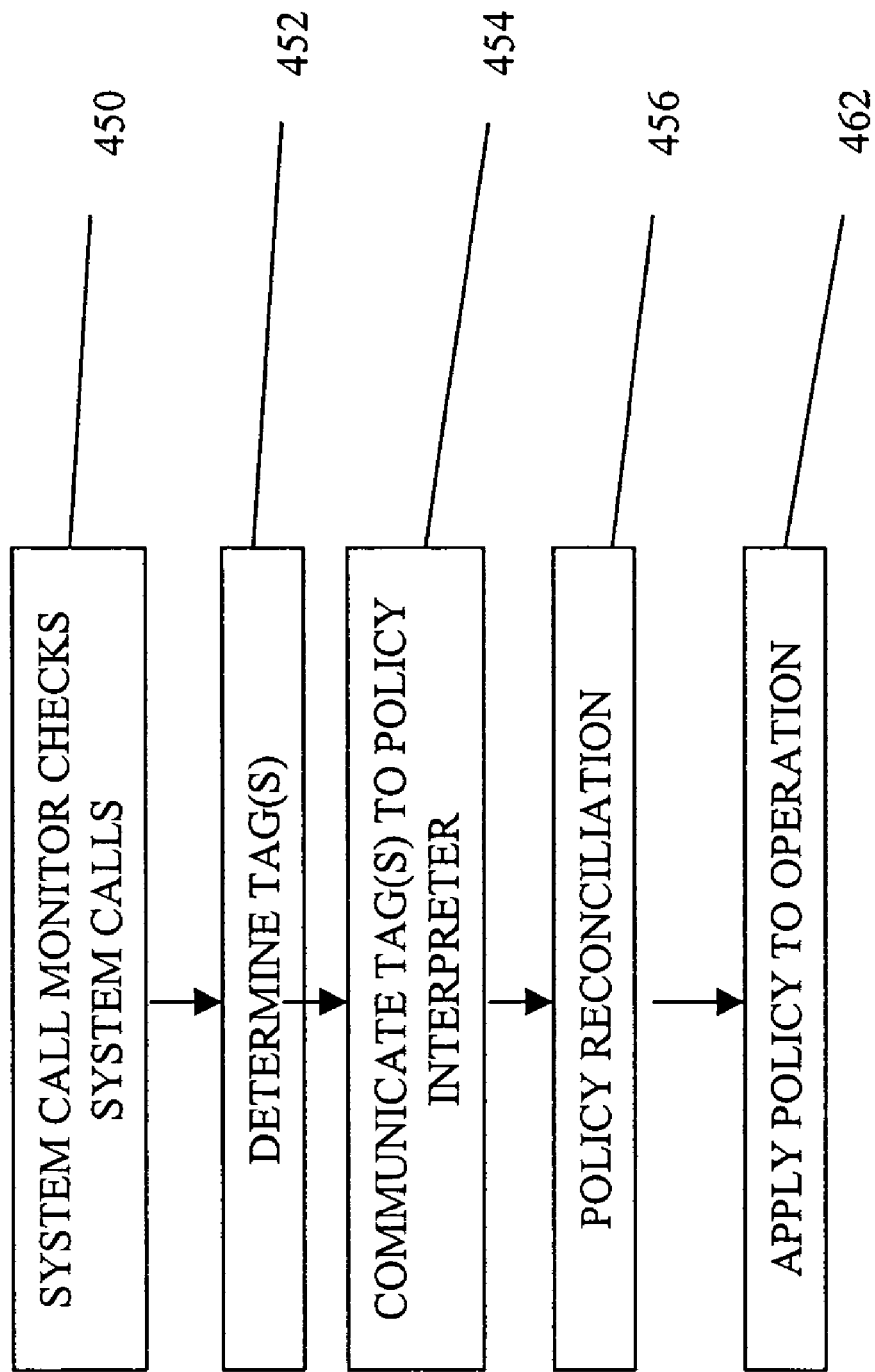
FIG. 9 shows a functional flow diagram of a method of operation of the apparatus of FIG. 8.

Operation of the apparatus shown in FIG. 8 is explained with reference to FIG. 9 which shows a functional flow diagram thereof.

In step 450 the data handling apparatus 400 runs on a computing platform 1 and the system call monitor 402 checks each system call at the kernel layer of the operating system to determine whether it is a system call in relation to which the data handling apparatus 400 is configured to control. Typically the controlled system calls are those involving writes of data to devices (which include writes to network sockets) so that the transfer of data externally of the operating system and computing platform memory can be controlled. The system call monitor 402 implemented at the kernel level keeps track of new file descriptors being created during the process execution that refer to controlled external devices and network sockets. The system call monitor 402 also monitors all system calls where data is written to these file descriptors. Whenever a system call is intercepted that causes data write or send, the process is stopped and both the data and the file descriptor that this data is being written/sent to are examined. The system call monitor 402 has a list of predetermined system calls that should always be denied or permitted. If the intercepted system call falls into this category the system call monitor uses this fast method to permit or deny a system call. If the fast method cannot be used, the system call monitor needs to ask the policy interpreter 406 in user space for a policy decision. Thus either the system call monitor 402 or the tag determiner 404 and policy interpreter 406 can be a means for applying a data handling policy to the system call upon a predetermined system call being detected.

Once a predetermined system call has been detected by system call monitor 402, then in step 452 the tag determiner 404 determines what security tag or tags are associated with the corresponding operation. For the purpose of this explanation of an embodiment of the present invention, it is assumed the system call is of data from a file to a networked device. Using the data tagging described above, a plurality of tags will apply. Using other tagging techniques there may only be one tag associated with a file. For this embodiment it is assumed that there are several tags associated with the data. The tags associated with the data relevant to the action of the system call are communicated to the policy interpreter 406 in step 454.

Figure 10:
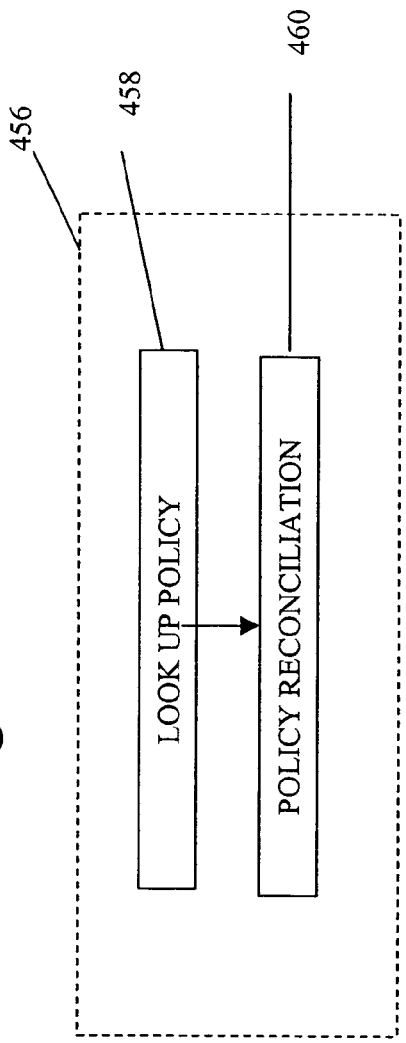
FIG. 10 shows a functional flow diagram of part of the method of FIG. 9.

In step 456, the policy interpreter 406 determines the policy to be applied to the data. Referring to FIG. 10, the sub-steps of step 456 are shown in more detail. In step 458 a policy for each tag is looked up from the policy database 408. Since the so determined policies may be inconsistent, the resultant policies are supplied to policy reconciler 410, which in step 460 carries out a policy reconciliation to generate a policy to apply to the data. The nature of the policy reconciliation is a matter of design choice for a person skilled in the art. At its simplest policy reconciliation will provide that the most restrictive policy derived from all restrictions and requirements of the policies associated with the tags applies, effectively ANDing all the policies. However, many alternatives exist. The policy reconciler may make policy determinations based on the intended destination of the relevant data, which is known from information provided by the system call monitor 402.

Once a reconciled policy has been determined by policy reconciler 410, this is the output from policy interpreter 406 that is returned to system call monitor 402. The system call monitor allows the stopped process to continue execution after it applies the result to the operation in question in step 462 (FIG. 9).

When the conditional tag detector 418 determines from the instrumental machine code that a conditional has been reached, tags are propagated with variables associated with the conditionals in the manner described above by conditional tag propagator 420.

Generally there will be three policy applications. The first will be to permit the operation. The second will be to block the operation. The third will be to permit the operation but to vary it in some way. The main variation is the encryption of the data being transmitted for additional security.

In any data transmission, tags may be propagated as described above.

Thus embodiments of the present invention provide a data handling apparatus for a computer platform using an operating system executing a process, the apparatus comprising a system call monitor for detecting predetermined system calls, and means for applying a data handling policy to the system call upon a predetermined system call being detected, whereby the data handling policy is applied for all system calls involving the writing of data outside the process.

Further, embodiments of the present invention provide a data handling method for a computer platform using an operating system executing a process, the method comprising the steps of: detecting predetermined system calls, and applying a data handling policy to the system call upon a predetermined system call being detected, the data handling policy being applied for all system calls involving the writing of data outside the process.

There is also provided a computer program for controlling a computing platform to operate in accordance with such a method and a computer platform configured to operate according to such a method.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A data handling apparatus for a computer platform using an operating system executing a process, the apparatus comprising
   a data management unit arranged to associate data management information with data input to the process and to regulate operating system operations involving the data according to the data management information;
   a system call monitor implemented in the computer platform and operating to detect predetermined system calls and data manipulation by the process so as to modify identifiable characteristics of the data, wherein the system call monitor includes supervisor code that is executed within a program flow of the process, and
   means for applying a data handling policy upon detecting:
   (1) a predetermined data type based on a tag or label associated with the data manipulated by the process or based on a format of the data manipulated by the process; and
   (2) one of the predetermined system calls being detected, whereby the data handling policy is applied for all system calls involving the writing of data outside the process, wherein
   the supervisor code controls the process at run time to administer the operating system data management unit.

2. The data handling apparatus according to claim 1, in which predetermined system calls are those involving the transmission of data externally of the computing platform.

3. The data handling apparatus according to claim 1, in which the means for applying a data handling policy comprises a tag determiner for determining any security tags associated with data manipulated by the process or based on the format of the data manipulated by the process handled by the system call, and a policy interpreter for determining a policy according to any such security tags and for applying the policy.

4. The data handling apparatus according to claim 3, in which the policy interpreter is configured to use the intended destination of the data as a factor in determining the policy for the data.

5. The data handling apparatus according to claim 4, in which the policy interpreter in its application of the policy automatically encrypts at least a portion of the data.

6. The data handling apparatus according to claim 3, in which the policy interpreter comprises a policy database including tag policies and a policy reconciler for generating a composite policy from the tag policies relevant to the data.

7. The data handling apparatus according to claim 1, in which the computing platform further comprises a memory space, and is arranged to load the process into the memory space and run the process under the control of the data management unit.

8. The data handling apparatus according to claim 1, in which the data management information is associated with at least one data sub-unit as data is input to a process from a data unit comprising a plurality of sub-units.

9. The data handling apparatus according to claim 1, in which data management information is associated with each independently addressable data unit.

10. The data handling apparatus according to claim 1, in which the data management unit comprises part of an operating system kernel space.

11. The data handling apparatus according to claim 10, in which the operating system kernel space comprises a tagging driver arranged to control loading of the supervisor code into the memory space with the process.

12. The data handling apparatus according to claim 11, in which the memory space further comprises a data management information area under control of the supervisor code arranged to store the data management information.

13. The data handling apparatus according to claim 1, in which the supervisor code is arranged to analyze instructions of the process to identify operations involving the data, and, provide instructions relating to the data management information with the operations involving the data.

14. The data handling apparatus according to claim 1, in which the data management unit comprises a data filter to identify data management information associated with data that is to be read into the memory space.

15. The data handling apparatus according to claim 1, in which the data management unit further comprises a tag management module arranged to allow a user to specify data management information to be associated with data.

16. The data handling apparatus according to claim 1, in which the data management unit comprises a tag propagation module arranged to maintain an association with the data that has been read into the process and the data management information associated therewith.

17. The data handling apparatus according to claim 16, in which the tag propagation module is arranged to maintain an association between an output of operations carried out within the process and the data management information associated with the data involved in the operations.

18. The data handling apparatus according to claim 16, in which the tag propagation module comprises state machine automatons arranged to maintain an association between an output of operations carried out within the process and the data management information associated with the data involved in the operations.

19. A data handling method for a computer platform using an operating system executing a process, the method comprising the steps of:
 associating data management information with data input to the process;
 detecting in the computer platform both (i) a predetermined data type based on a tag or label associated with the data or based on a format of the data and (ii) predetermined system calls involving the writing of data outside the process, and
 applying a data handling policy to a system call upon both said predetermined data type and said a predetermined system call being detected, the data handling policy being applied for all system calls involving the writing of data outside the process; and
 regulating operating system operations involving the data according to the data management information, wherein supervisor code administers the method by controlling the process at run time.

20. The data handling method according to claim 19, in which the policy is to require the encryption of at least a portion of the data.

21. The data handling method according to claim 20, in which in its application of the policy at least a portion of the data is automatically encrypted.

22. The data handling method according to claim 19, in which predetermined system calls are those involving the transmission of data externally of the computing platform.

23. The data handling method according to claim 19, in which the method includes the steps of: determining any security tags associated with data handled by the system call, determining a policy according to any such tags and applying the policy.

24. The data handling method according to claim 23, in which a composite policy is generated from the tag policies relevant to the data.

25. The data handling method according to claim 23, in which the intended destination of the data is used as a factor in determining the policy for the data.

26. The data handling method according to claim 19, in which the step (a) comprises associating data management information with data as the data is read into a memory space.

27. The data handling method according to claim 19, in which the step (a) comprises associating data management information with at least one data sub-unit as data is read into a memory space from a data unit comprising a plurality of data sub-units.

28. The data handling method according to claim 19, in which the step (a) comprises associating data management information with each independently addressable data unit that is read into the memory space.

29. The data handling method according to claim 19, in which the data management information is written to a data management memory space under control of the supervisor code.

30. The data handling method according to claim 29, in which the supervisor code comprises state machine automatons arranged to control the writing of data management information to the data management memory space.

31. The data handling method according to claim 19, in which the step (b) comprises sub-steps
 (b1) identifying an operation involving the data;
 (b2) if the operation involves the data and is carried out within the process, maintaining an association between an output of the operation and the data management information; and
 (b3) if the operation involving the data includes a write operation to a location external to the process, selectively performing the operation dependent on the data management information.

32. The data handling method according to claim 31, in which, the step (b1) comprises: analyzing process instructions to identify operations involving the data; and, providing instructions relating to the data management information with the operations involving the data.

33. The data handling method according to claim 19, in which the process instructions are analyzed as blocks, each block defined by operations up to a terminating condition.

34. The data handling method according to claim 19, performed by a computer platform executing a computer program stored in computer readable media.

35. The data handling method according to claim 19, performed by the computer platform.

36. A data handling apparatus for a computer platform using an operating system executing a process, the apparatus comprising:
 a data management unit arranged to associate data management information with data input to the process and to regulate operating system operations involving the data according to the data management information;
 a system call monitor implemented in the computer platform and operating to detect predetermined system calls and data handled by the process, wherein the system call monitor includes supervisor code that is executed within a program flow of the process and wherein the supervisor code controls the process at run time to administer the operating system data management unit, and
 a policy interpreter for applying a data handling policy to the system call upon both (i) a predetermined data type based on a tag or label associated with the data handled by the process or based on a format of the data handled by the process and (ii) a predetermined system call which involves the writing of data outside the process.

* * * * *

UNITED STATES PATENT AND TRADEMARK OFFICE
CERTIFICATE OF CORRECTION

PATENT NO. : 7,908,640 B2  Page 1 of 1
APPLICATION NO. : 10/765719
DATED : March 15, 2011
INVENTOR(S) : Beresnevichiene et al.

It is certified that error appears in the above-identified patent and that said Letters Patent is hereby corrected as shown below:

In column 14, line 20, in Claim 3, delete "with data" and insert -- with the data --, therefor.

In column 16, line 38, in Claim 34, delete "by a" and insert -- by the --, therefor.

Signed and Sealed this
Fourteenth Day of June, 2011

David J. Kappos
*Director of the United States Patent and Trademark Office*